US005238154A

United States Patent [19]

Zuriel

[11] Patent Number: 5,238,154

[45] Date of Patent: Aug. 24, 1993

[54] DEVICE FOR CLEANING SURFACES USING CHEMICAL DECONTAMINANTS

[75] Inventor: Hillel Zuriel, Nathanya, Israel

[73] Assignee: The State of Israel, Ministry of Defence, Rafael Armament Development Authority, Tel-Aviv, Israel

[21] Appl. No.: 904,043

[22] Filed: Jun. 18, 1992

[30] Foreign Application Priority Data

Jun. 24, 1991 [IL] Israel ........................................ 98594

[51] Int. Cl.[5] ................................................ B67D 5/58

[52] U.S. Cl. .................................... 222/189; 222/145; 222/190; 239/310; 239/654; 406/146

[58] Field of Search ...................... 222/129.2, 133, 145, 222/189, 190, 637; 239/310, 346, 654; 406/146

[56] References Cited

U.S. PATENT DOCUMENTS 3,039,655 6/1962 Pfeuffer .......................... 222/133 X
4,385,034 5/1983 Gacer ............................... 239/310 X
4,815,414 3/1989 Duffy et al. .................... 239/654 X

FOREIGN PATENT DOCUMENTS 2202326 7/1973 Fed. Rep. of Germany ...... 406/146

*Primary Examiner*—Andres Kashnikow
*Assistant Examiner*—J. A. Kaufman
*Attorney, Agent, or Firm*—Mason, Fenwick & Lawrence

[57] ABSTRACT

A device for cleaning surfaces of chemical contaminants. The device comprises a hopper-like vessel having upper and lower chambers separated by a horizontal partition that constitutes the bottom of the upper chamber; an inverted U-shaped withdrawal tube located within said upper chamber and having intake and delivery legs which intake leg terminates short of the bottom of the upper chamber and which delivery leg opens into said lower chamber; an injector pipe having a nozzle located within the lower chamber and aligned therewith a delivery pipe having its intake end located within the lower chamber, the injection and delivery pipes producing together a pumping effect whereby the decontaminating agent is sucked from the upper chamber and a dispersion is formed in situ.

20 Claims, 1 Drawing Sheet

DEVICE FOR CLEANING SURFACES USING CHEMICAL DECONTAMINANTS

FIELD OF THE INVENTION

The present invention is in the field of decontamination and more specifically concerns decontamination of surfaces such as floors, pavements, streets and the like from noxious chemical contaminants such as chemical warfare material, inadvertently spilled chemical raw material used in production, and the like.

BACKGROUND OF THE INVENTION AND PRIOR ART

For the decontamination of chemically contaminated surfaces, it is necessary to spread on the surface chemical material which neutralizes the noxious effect of the contaminant. For example, where the noxious material is acidic the neutralizing agent will be basic, and vice versa; and there may be other forms of neutralization such as compounding the contaminants, e.g. in the case of elementary bromine, and the like. For the performance of such decontamination, it is customary to use a dispensing hopper which is continuously or intermittently charged with a ready-mixed aqueous dispersion of the decontaminating agent. At its lower part, the hopper comprises two horizontally aligned pipes axially spaced from each other, one serving for the injection of water and the other for the delivery of a liquid phase and which together form a pump which sucks the said aqueous dispersion suspension into the delivery pipe from which it is ejected. In the course of operation, the hopper is moved along and across the contaminated area with the object of spreading the decontaminating agent thereon.

Experience has shown that these known dispensers suffer from a fundamental defect in that the ready-made aqueous dispersion charged into the hopper tends to clog and block the region around the two aligned pipes and also the interior of the delivery pipe, with the result that after a relatively short while the dispenser no longer functions and has to be replaced for servicing. Apart from the operational inconvenience involved, this also prolongs significantly the decontamination operation, which is an obvious serious disadvantage.

It is therefore the object of the present invention to provide an improved dispenser apparatus for the decontamination of chemically contaminated surfaces.

SUMMARY OF THE INVENTION

In accordance with the present invention there is provided a dispenser for spreading an aqueous dispersion of a decontaminating- agent for the decontamination of chemically contaminated surfaces, comprising a hopper-like vessel having upper and lower chambers separated by means of a horizontal partition that constitutes the bottom of the upper chamber;

an inverted U-shaped withdrawal tube located within said upper chamber and having intake and delivery legs which intake leg terminates short of the bottom of the upper chamber and which delivery leg opens into said lower chamber;

an injector pipe having a nozzle located within the lower chamber and aligned therewith a delivery pipe having its intake end located within the lower chamber, said nozzle and intake end being spaced from each other whereby water flowing from the injector pipe to the delivery pipe produces a pumping effect.

In a preferred embodiment of the invention, the delivery leg of said inverted U-shaped withdrawal tube is fitted with flow control means.

In operation, a powderous or granulated solid decontaminating agent is continuously or intermittently charged into the upper chamber and water is injected into the lower chamber through said injector pipe and is delivered via said delivery pipe. Due to the pumping effect of the water flowing between the two pipes, the decontaminating agent is sucked from the upper chamber via the inverted U-shaped withdrawal tube and across the lower chamber into the water jet injected therein, travelling from the injection pipe to the delivery pipe, with the consequence that an aqueous dispersion holding the decontaminating agent is formed and ejected via the delivery pipe. In this way, mixing of the solid contaminating agent with water occurs only in situ with hardly any likelihood of clogging in the course of operation.

Preferably, the chamber is fitted with a sieve to hold back excessively large particles that may be present in the charged solid material.

DESCRIPTION OF THE DRAWINGS

For better understanding the invention will now be described, by way of example only, with reference to the annexed drawings, in which.

DESCRIPTION OF A SPECIFIC EMBODIMENT

Figure 1:
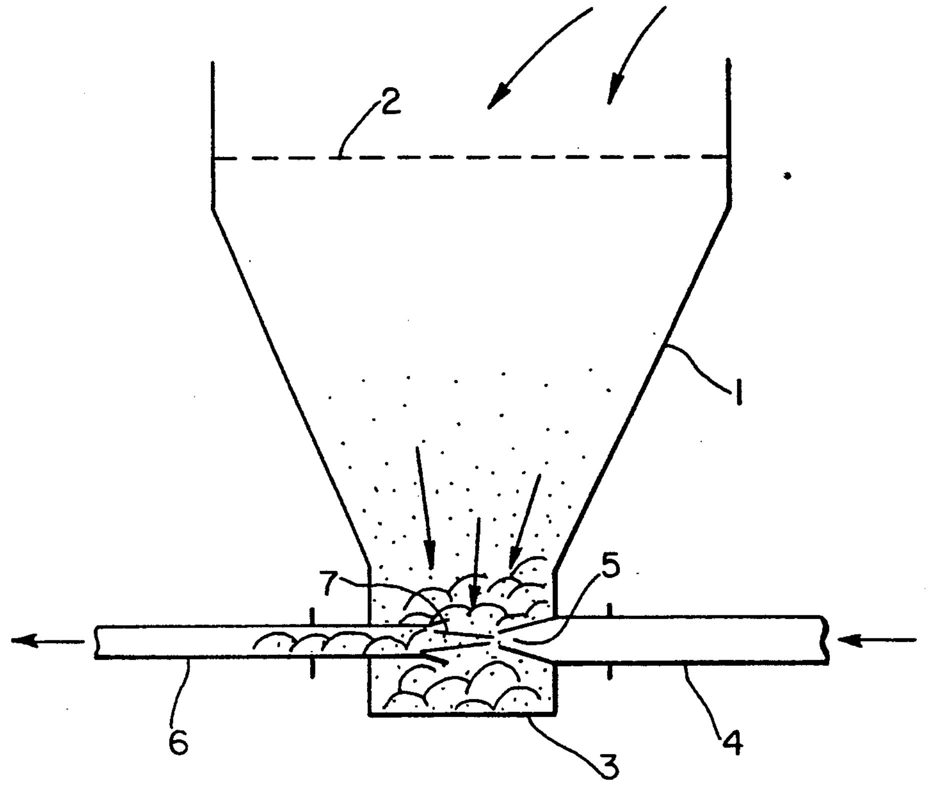
FIG. 1 is a vertical section of a prior art dispenser of the kind specified.

The prior art dispenser of FIG. 1 comprises a hopper 1 fitted with a sieve 2. Hopper 1 comprises a lower cylindrical portion 3 into which open two horizontally aligned pipes 4 and 6. Pipe 4, fitted with an injection nozzle 5 serves for the injection of water and pipe 6, fitted with an intake end 7 serves for the delivery of an aqueous dispersion of a decontaminating agent. As shown, the injection nozzle 5 and intake end 7 are spaced from each other, so that when water flows between them a Venturi-type pump is formed. In the course of operation, a ready-mixed aqueous dispersion of a decontaminating agent is charged into hopper 1 continuously or intermittently and is sucked into delivery pipe 6 by the pumping effect of the water travelling from pipe 4 to pipe 6. As, however, the decontaminating agent arrives at the cylindrical portion 3 of hopper 1 in ready-mixed form and encounters there a jet of water, the resulting turbulence tends to deposit solid material within the cylindrical chamber 3 and inside pipe 6 so that after a relatively short time of operation the apparatus is clogged and has to be withdrawn for servicing.

Figure 2:
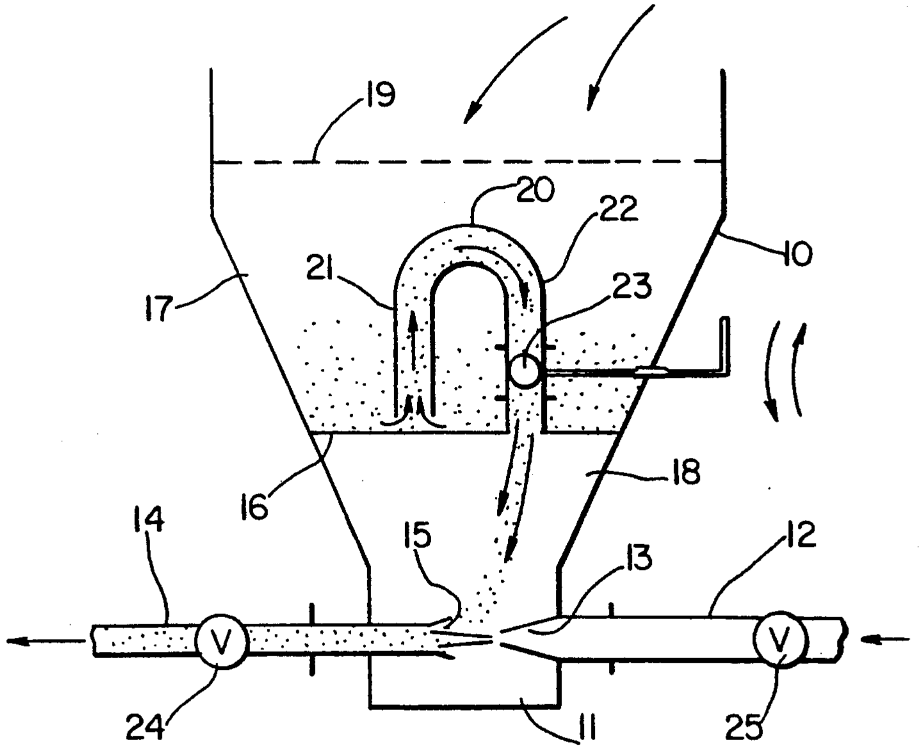
FIG. 2 is a vertical section of a dispenser device according to the invention.

The improved dispenser according to the invention is shown in FIG. 2. It comprises a hopper-like vessel 10 with a lower cylindrical portion 11, an injector pipe 12 with a nozzle 13 inside cylindrical portion 11 and aligned therewith a delivery pipe 14 with an intake end 15 located within the cylindrical portion 11, with nozzle 13 and intake end 15 being spaced from each other so that water flowing between them produces a Venturi-type pumping effect.

In accordance with the invention, hopper 10 is divided by means of a partition 16 into an upper chamber 17 and a lower chamber 18, which latter merges into the cylindrical portion 11. Partition 16 constitutes the bottom of the upper chamber 17, which latter is also fitted near its head with a sieve 19.

An inverted U-shaped withdrawal tube 20 having an intake leg 21 and a delivery leg 22 is located within the upper chamber 17 and leads from near the bottom thereof into the lower chamber 18 in the manner shown. Delivery leg 22 of tube 20 is fitted with a manually operable flow control valve 23.

During operation, solid decontaminating agent is continuously or intermittently charged into the upper chamber 17, with excessively large particles being retained by sieve 19. Due to the pumping effect of the water flowing between the aligned pipes 12 and 14, the solid decontaminating agent is continuously sucked from the upper chamber 17 via the lower chamber 18 into the water jet emerging from injection pipe 12 and taken in by delivery pipe 14. In this way, solid decontaminating agent is mixed in situ inside the cylindrical portion 11 of the lower chamber 18 in the region around the nozzle 13 and intake 15 and upon mixing, the resulting aqueous dispersion is immediately drawn into pipe 14 and delivered therethrough to the surface to be decontaminated.

The rate of flow of the solid decontaminating agent through withdrawal tube 20 can be controlled by valve 23. Likewise, and independent thereof, the intensity of the jet of aqueous dispersion that is being spread onto the contaminated, surface is controllable by means of control valves 24, 25 in either or both of pipes 12 and 14 in a manner known per se.

If desired, the delivery end of leg 22 of the inverted U-shaped pipe 20 may extend beyond partition 16 and reach down to any desired level within the lower chamber 18.

I claim:

1. A dispenser for spreading an aqueous dispersion of a decontaminating agent for the decontamination of chemically contaminated surfaces, comprising a vessel having upper and lower chambers separated by means of a horizontal partition that constitutes the bottom of the upper chamber;

an inverted U-shaped withdrawal tube located within said upper chamber and having intake and delivery legs which intake leg terminates short of the bottom of the upper chamber and which delivery leg opens into said lower chamber;

an injector pipe having a nozzle located within the lower chamber and aligned therewith a delivery pipe having its intake end located within the lower chamber, said nozzle and intake end being spaced from each other whereby water flowing from the injector pipe to the delivery pipe produces a pumping effect.

2. A dispenser according to claim 1, wherein said withdrawal tube is fitted with a control valve.

3. A dispenser according to claim 1, wherein the upper chamber is fitted near its head with a sieve.

4. A dispenser according to claim 2, wherein the upper chamber is fitted near its head with a sieve.

5. A dispenser according to claim 1, wherein the injector pipe includes a control valve for controlling the flow of water from the injector pipe.

6. A dispenser according to claim 1, wherein the delivery pipe includes a control valve for controlling the flow of an aqueous dispersion of decontaminating agent from the delivery pipe.

7. A dispenser according to claim 1, wherein the injector pipe includes a control valve for controlling the flow of water from the injector pipe, and the delivery pipe includes a control valve for controlling the flow of an aqueous dispersion of decontaminating agent from the delivery pipe.

8. A dispenser according to claim 1, wherein the delivery leg of the inverted U-shaped withdrawal tube extends downward below the horizontal partition into the lower chamber.

9. A dispenser for spreading an aqueous dispersion of a decontaminating agent, comprising:

vessel having upper and lower chambers separated by means of a horizontal partition that constitutes the bottom of the upper chamber;

an inverted U-shaped withdrawal tube located within the upper chamber and having intake and delivery legs, wherein the intake leg terminates short of the bottom of the upper chamber and the delivery leg opens into the lower chamber;

an injector pipe having a nozzle located within the lower chamber, and a delivery pipe having an intake end located within the lower chamber, wherein the injector pipe and delivery pipe are aligned such that water flowing from the injector pipe to the delivery pipe causes decontaminating agent to be continuously sucked from the upper chamber through the U-shaped delivery tube into the lower chamber, to form an aqueous dispersion of decontaminating agent which is drawn into the delivery pipe.

10. A dispenser according to claim 9, wherein the withdrawal tube is fitted with a control valve for controlling the flow of decontaminating agent entering the lower chamber.

11. A dispenser according to claim 9, wherein the upper chamber is fitted near its head with a sieve.

12. A dispenser according to claim 10, wherein the upper chamber is fitted near its head with a sieve.

13. A dispenser according to claim 9, wherein the injector pipe includes a control valve for controlling the flow of water from the injector pipe.

14. A dispenser according to claim 9, wherein the delivery pipe includes a control valve for controlling the flow of an aqueous dispersion of decontaminating agent from the delivery pipe.

15. A dispenser according to claim 9, wherein the injector pipe includes a control valve for controlling the flow of water from the injector pipe, and the delivery pipe includes a control valve for controlling the flow of an aqueous dispersion of decontaminating agent from the delivery pipe.

16. A dispenser according to claim 9, wherein the delivery leg of the inverted U-shaped withdrawal tube extends downward below the horizontal partition into the lower chamber.

17. A dispenser for spreading an aqueous dispersion of a decontaminating agent, comprising:

a vessel having upper and lower chambers separated by means for a horizontal partition that constitutes the bottom of the upper chamber, wherein the upper chamber is fitted near its head with a sieve;

an inverted U-shaped withdrawal tube located within the upper chamber and having intake and delivery legs, wherein the intake leg terminates short of the bottom of the upper chamber and the delivery leg opens into the lower chamber, the withdrawal tube including a control valve for controlling the flow of a solid decontaminating agent into the lower chamber;

an injector pipe having a nozzle located within the lower chamber, and a delivery pipe having an intake end located within the lower chamber, wherein the injector pipe and delivery pipe are aligned such that water flowing from the injector pipe to the delivery pipe causes the solid decontaminating agent to be continuously sucked from the upper chamber through the U-shaped delivery tube into the lower chamber, to form an aqueous dispersion of decontaminating agent which is drawn into the delivery pipe.

18. A dispenser according to claim 17, wherein the injector pipe includes a control valve for controlling the flow of water from the injector pipe.

19. A dispenser according to claim 17, wherein the delivery pipe includes a control valve for controlling the flow of the aqueous dispersion of decontaminating agent from the delivery pipe.

20. A dispenser according to claim 17, wherein the injector pipe includes a control valve for controlling the flow of water from the injector pipe, and the delivery pipe includes a control valve for controlling the flow of an aqueous dispersion of decontaminating agent from the delivery pipe.

* * * * *